United States Patent
Furue et al.

(10) Patent No.: US 9,361,000 B2
(45) Date of Patent: Jun. 7, 2016

(54) INFORMATION DISPLAY DEVICE FOR VEHICLE

(71) Applicant: MAZDA MOTOR CORPORATION, Hiroshima (JP)

(72) Inventors: Aya Furue, Hiroshima (JP); Keiichirou Yamamoto, Higahihiroshima (JP); Akihiro Fujiwara, Higahihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 220 days.

(21) Appl. No.: 14/311,869

(22) Filed: Jun. 23, 2014

(65) Prior Publication Data

US 2014/0380243 A1   Dec. 25, 2014

(30) Foreign Application Priority Data

Jun. 24, 2013   (JP) .................................. 2013-132104

(51) Int. Cl.
| | |
|---|---|
| G06F 3/048 | (2013.01) |
| G06F 3/0482 | (2013.01) |
| G06F 3/0338 | (2013.01) |
| G06F 3/0362 | (2013.01) |
| G05G 9/047 | (2006.01) |

(52) U.S. Cl.
CPC ............ *G06F 3/0482* (2013.01); *G06F 3/0338* (2013.01); *G06F 3/0362* (2013.01); *G05G 9/04788* (2013.01); *G05G 2009/04777* (2013.01); *G05G 2009/04781* (2013.01)

(58) Field of Classification Search
None
See application file for complete search history.

(56) References Cited

U.S. PATENT DOCUMENTS

| | | | | |
|---|---|---|---|---|
| 2006/0132469 A1* | 6/2006 | Lai | ........................ | B60K 35/00 345/184 |
| 2012/0173975 A1* | 7/2012 | Herz | ..................... | G06F 3/0482 715/716 |
| 2013/0145360 A1* | 6/2013 | Ricci | ........................ | G06F 9/54 717/174 |
| 2013/0166146 A1* | 6/2013 | Tanaka | .................. | G06F 3/0488 701/36 |

FOREIGN PATENT DOCUMENTS

JP        2008-242960 A       10/2008

* cited by examiner

*Primary Examiner* — Thanh Vu

(74) *Attorney, Agent, or Firm* — Studebaker & Brackett PC

(57) ABSTRACT

A dial switch is operative to be rotated or tilted and to be pushed down, which can select any one of icons displayed on a menu screen of a display portion and display information regarding a function of an onboard apparatuses corresponding to a selected icon on the display portion. A central pushing switch is configured to function as a home key such that a default-state menu screen is displayed on the display portion whenever this switch is pushed down. Left or right pushing switches is configured to function as a shortcut key such that information regarding a function of an onboard apparatus corresponding to left-positioned or right-positioned icons positioned on left and right sides of a central icon is displayed on the display portion whenever the left or right pushing switches is pushed down.

9 Claims, 15 Drawing Sheets

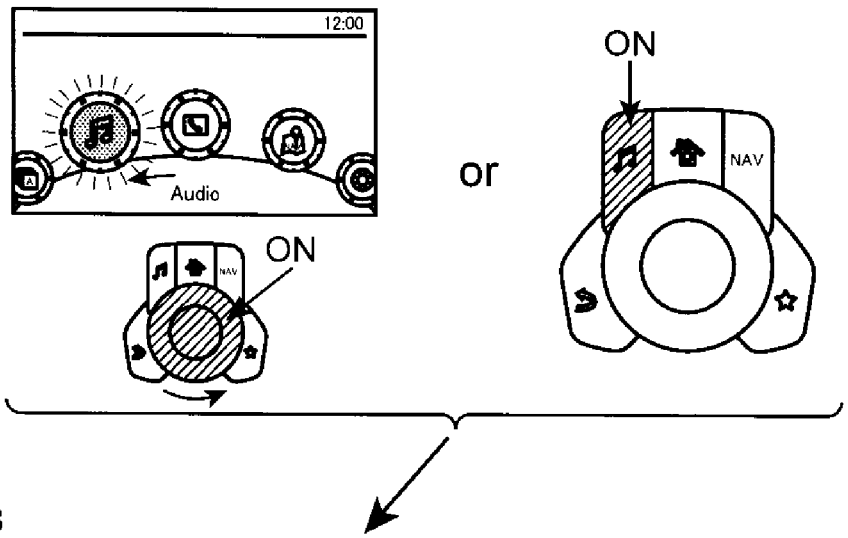
FIG. 9A
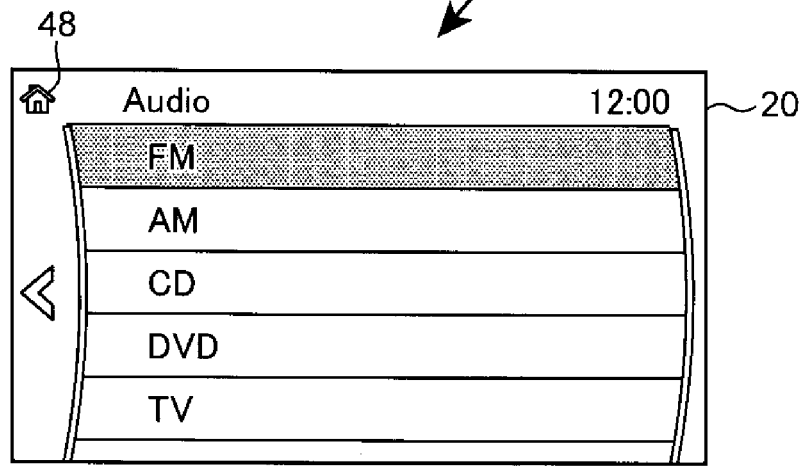
FIG. 9B
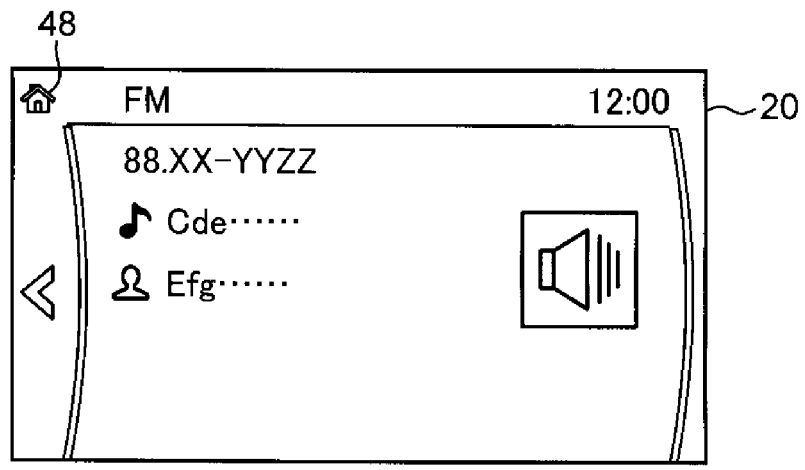

INFORMATION DISPLAY DEVICE FOR VEHICLE

BACKGROUND OF THE INVENTION

The present invention relates to an information display device for a vehicle which comprises an operational portion provided on a center console in a vehicle compartment, a display portion provided at a specified position in the vehicle compartment which is visible to a driver, and a control portion to control display of the display portion in accordance with an operation of the operational portion.

Japanese Patent Laid-Open Publication No. 2008-242960 is known as an example to show the above-described information display device for a vehicle. The information display device for a vehicle disclosed in the above-described patent document comprises a display portion to display information regarding functions of various onboard apparatuses, such as navigation and audio, wherein contents displayed on the display portion are controlled based on signals outputted from an operational portion operated by a driver. The operational portion comprises a joystick type of pointing device, some determination switches provided around the pointing device, and shortcut switches provided at a front end portion of the operational portion.

According to the above-described information display device, by operating the pointing device when an item-selection screen (a screen to display plural selective items) is displayed on the display portion, a cursor is moved on the screen so that any one of the plural selective items can be selected through a cursor's positional matching. At this point, by pushing the corresponding determination switch, the function corresponding to the selected item can be executed.

The similar operation can be also attained by using the shortcut switches. That is, by pushing any one of the shortcut switches, a specified function corresponding to this pushed shortcut switch (such as displaying a navigation screen or tuning on an audio device) can be executed directly without conducting the above-described selection on the menu screen by means of the pointing device and the determination switches.

The shortcut switches of the above-described patent document are ones to execute a specified function directly, respectively. Therefore, the larger the number of the shortcut switches is, the more functions the shortcut switches can execute directly. Thereby, the speed of function operation can be improved properly. However, an increase of the number of the shortcut switches may deteriorate operator's recognition of correspondence between the functions and the switches, so that the operation of the switches may become difficult for beginners who do not have enough experiences, especially. Further, a larger area may be occupied by the shortcut switches, so that there is a concern that an arrangement place may be improperly limited or a layout of other components may be deteriorated.

SUMMARY OF THE INVENTION

The present invention has been devised in view of the above-described matters, and an object of the present invention is to provide an information display device for a vehicle which can provide the necessary operations with the limited number of switches and also the superior operability.

According to the present invention, there is provided an information display device for a vehicle, comprising an operational portion provided on a center console in a vehicle compartment, a display portion provided at a specified position in the vehicle compartment which is visible to a driver, and a control portion to control display of the display portion in accordance with an operation of the operational portion, wherein the operational portion comprises a dial switch and at least three pushing switches provided around the dial switch, the dial switch being operative to be rotated or tilted and to be pushed down, the three pushing switches being configured to be pushed down respectively, the three pushing switches being comprised of a central pushing switch and left and right pushing switches which are provided on left and right sides of the central pushing switch, respectively, the display portion is configured to display at least three different icons which are positioned side by side substantially laterally, together with a selection indication to show which icon is selected, as a menu screen for selecting functions of various onboard apparatuses corresponding to the three icons, the display portion being configured to display a default-state menu screen in which a centrally-positioned icon of the three icons is indicated as a selected icon when the dial switch is in a non-operational state of rotation or tilt, the control portion is configured to control the display of the display portion such that a position of the selection indication showing the selected icon is changed among the three icons in accordance with an operation of rotation or tilt of the dial switch when the menu screen is displayed on the display portion, and also such that information regarding the function of the onboard apparatus corresponding to the selected icon with the selection indication is displayed in accordance with an operation of down-pushing of the dial switch, the central pushing switch is configured to function as a home key such that the default-state menu screen is displayed on the display portion whenever the central pushing switch is pushed down, and the left and right pushing switches are configured to function as a shortcut key, respectively, such that information regarding the function of the onboard apparatus corresponding to a left-positioned icon of the three icons is displayed on the display portion whenever the left pushing switch is pushed down, and information regarding the function of the onboard apparatus corresponding to a right-positioned icon of the three icons is displayed on the display portion whenever the right pushing switch is pushed down.

According to the present invention, there can be two operational ways to execute the respective functions corresponding to the left-positioned icon and the right-positioned icon. One of the operational ways is to select any one of the left-positioned and right-positioned icons through the operation of rotation or tilt of the dial switch when the menu screen is displayed on the display portion (that is—to change the position of the selection indication showing the selected icon to any one of the both icons), then to push down the dial switch. The other way is to push down any one of the left and right pushing switches of the three pushing switches provided around the dial switch. According to the above-described other way, the specified function of the onboard apparatus corresponding to the left-positioned icon or the right-positioned icon can be executed directly whenever the left pushing switch or the right pushing switch is pushed down regardless of a previous (last) display state of the display portion, so that operational steps can be properly facilitated and the operational speed can be properly increased. Further, the three icons and the three pushing switches are associated with each other such that the function of the onboard apparatus corresponding to the left-positioned icon is associated with the function executed by operating (pushing down) the left pushing switch, whereas the function of the onboard apparatus corresponding to the right-positioned icon is associated with the function executed by operating (pushing down) the right pushing switch. Thus, an operator (driver) can intuitively recognize which pushing switch is to be operated (pushed down) for executing a specified function desired by the operator (driver), so that the superior operability can be obtained.

Herein, it may be considered that the central pushing switch positioned between the right and left pushing switches is configured to function as a shortcut key to directly execute the function of the onboard apparatus corresponding to the centrally-positioned icon. However, the present invention is configured such that the centrally-positioned icon is selected when the menu screen is in the default state, so that the function of the onboard apparatus corresponding to the centrally-positioned icon can be basically executed only by pressing down the dial switch. Accordingly, if the central pushing switch was provided so as to function as the above-described shortcut key, the same function could be possibly executed by pushing any one of the dial switch and the central pushing switch, so that the significance of existence of the central pushing switch would be lessened.

By contrast, the present invention is configured such that the central pushing switch functions as the home key to display the default-state menu screen on the display portion, so that improper duplication of the function of the dial switch and the function of the central pushing switch can be avoided. Accordingly, even if the home key which may be used often is provided, the increase of the number of pushing switches can be properly restrained. Thereby, the desired functions of the onboard apparatuses can be properly assigned to the smaller number of pushing switches, so that the operational portion can be properly compact and the operability can be improved.

According to an embodiment of the present invention, the dial switch is a columnar-shaped switch having a central axis extending vertically, and the three pushing switches are arranged in an arc shape around the dial switch in an area positioned in front of the dial switch. Thereby, the three pushing switches can be pushed down operationally by a forefinger, a middle finger and a third finger of a driver's hand, respectively, in a state in which a palm of the hand is placed on an upper face of the dial switch, so that the operability of the switches can be more improved.

According to another embodiment of the present invention, the above-described changing of the position of the selection indication among the three icons in accordance with the operation of rotation or tilt of the dial switch is executed while respective positions of the three icons displayed on the display portion are kept fixed. Thereby, since positional relationships of the respective icons and the three pushing switches provided in front of the dial switch are fixed (constant), a driver can easily recognize which icon becomes operative (active) for the function execution by operating the left pushing switch or the right pushing switch, especially.

According to another embodiment of the present invention, the three icons are displayed in another area than both-end portions of the display portion, and other icons than the three icons are displayed at the both-end portions of the display portion. Thereby, since the three icons corresponding to the functions regarding the three pushing switches are always displayed at a central area of the display portion, the superior operability can be provided even if the number of icons may increase.

Herein, a single icon may be preferably displayed at each of the both-end portions of the display portion, so that five icons, in total, are displayed on the display portion.

According to another embodiment of the present invention, the operational portion further comprises, in addition to the three pushing switches, a pushing switch for returning the display of the display portion to a previous (last) screen and a pushing switch for displaying a screen corresponding to another function which is registered in advance by a driver on the display portion, and the two additional pushing switches are arranged at rearward positions from the three pushing switches. Thereby, a large variety of operations can be executed by using the five pushing switches in total. Further, since the two additional pushing switches are arranged at the rearward positions from the three pushing switches, it can be prevented that the switches are operated by mistake, so that the superior operability can be properly maintained.

Other features, aspects, and advantages of the present invention will become apparent from the following description which refers to the accompanying drawings.

BRIEF DESCRIPTION OF THE DRAWINGS

FIG. 8A is a high-level screen; FIG. 8B is a low-level screen.

FIGS. 9A and 9B are diagrams to explain an example of an operational screen of an audio device displayed on the display portion: FIG. 9A is a high-level screen; FIG. 9B is a low-level screen.

FIG. 11A is a high-level screen; FIG. 11B is a low-level screen.

DETAILED DESCRIPTION OF THE INVENTION

Hereinafter, a preferred embodiment of the present invention will be described specifically referring to the accompanying drawings.

(1) Device Constitution

Figure 1:
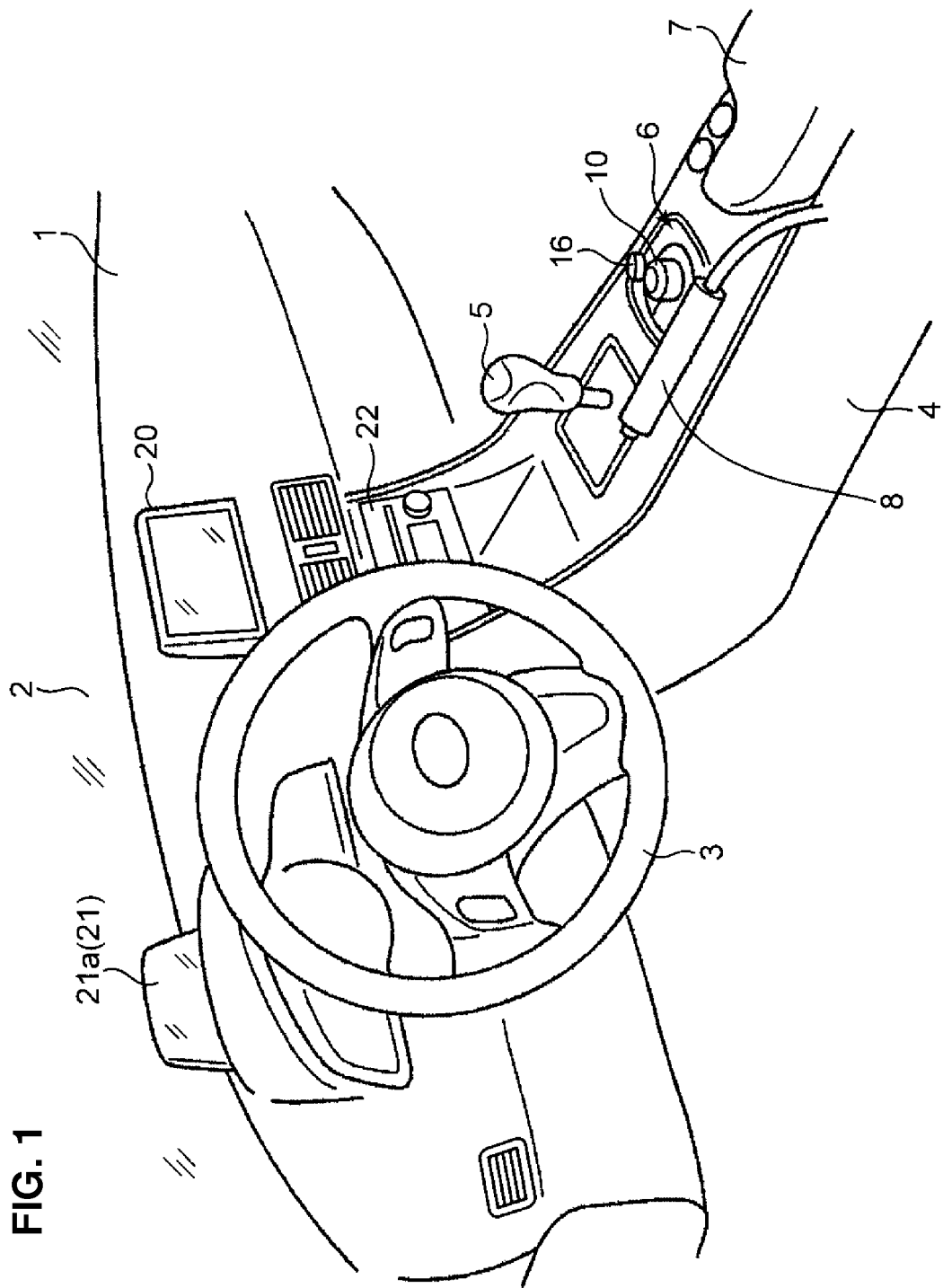
FIG. 1 is a perspective view showing the inside of a vehicle (a vehicle compartment) to which an information display device according to an embodiment of the present invention is applied.

FIG. 1 is a perspective view showing the inside of a vehicle (a vehicle compartment) to which an information display device according to the embodiment of the present invention is applied. As shown in this figure, an instrument panel 1 which extends in a vehicle width direction along a lower side portion of a windshield 2 is provided at a front end portion of the vehicle compartment. A center console 4 is provided to project at a central portion, in the vehicle width direction, of a vehicle-compartment floor F. The center console 4 extends rearward continuously from a central portion of the instrument panel 1. A driver's seat, not illustrated, in which a driver is seated, is provided on the vehicle-compartment floor F on the left side of the center console 4. A steering wheel 3 which is to be operated by the driver is provided in front of the driver's seat (at a left-side position of the instrument panel 1). While the information display device of the present embodiment is applied to a vehicle equipped with the left-side-positioned steering wheel as described above, the present invention is applicable to a vehicle equipped with a right-side-positioned steering wheel, of course.

On the center console 4 are arranged a shift lever 5 to operate a transmission of the vehicle, an operational portion 6 to operate some apparatuses installed onto the vehicle (on-board apparatuses), and an armrest 7 to place an arm of the driver thereon. Further, on the left side of the center console 4 is arranged a brake lever 8 to operate a parking brake.

A display portion 20 is provided on an upper face of the central portion, in the vehicle width direction, of the instrument panel 1. The display portion 20 is retractable so as to have both a standing position and a retracting position. This display portion 20 is comprised of a full-color liquid display, for example, a rear face of which constitutes a display screen for displaying various information and images. The position of the display screen of the display portion 20 is arranged at a preferable position which is visible to the driver seated in the driver's seat.

A head-up display device 21 (hereinafter, referred to as "HUD") is provided at a left-side position on the upper face of the instrument panel 1 (in front of the steering wheel 3). The HUD 21 comprises a half mirror 21a which stands from the upper face of the instrument panel 1 and a projector, not illustrated, to project images onto the half mirror 21a. The half mirror 21a displays various kinds of driving support information (a vehicle traveling speed, for example).

An audio device 22 is installed at a front portion of the center console 4. The audio device 22 is a device to play music or image and includes a CD/DVD player, AM/FM tuners and so on.

Figure 2:
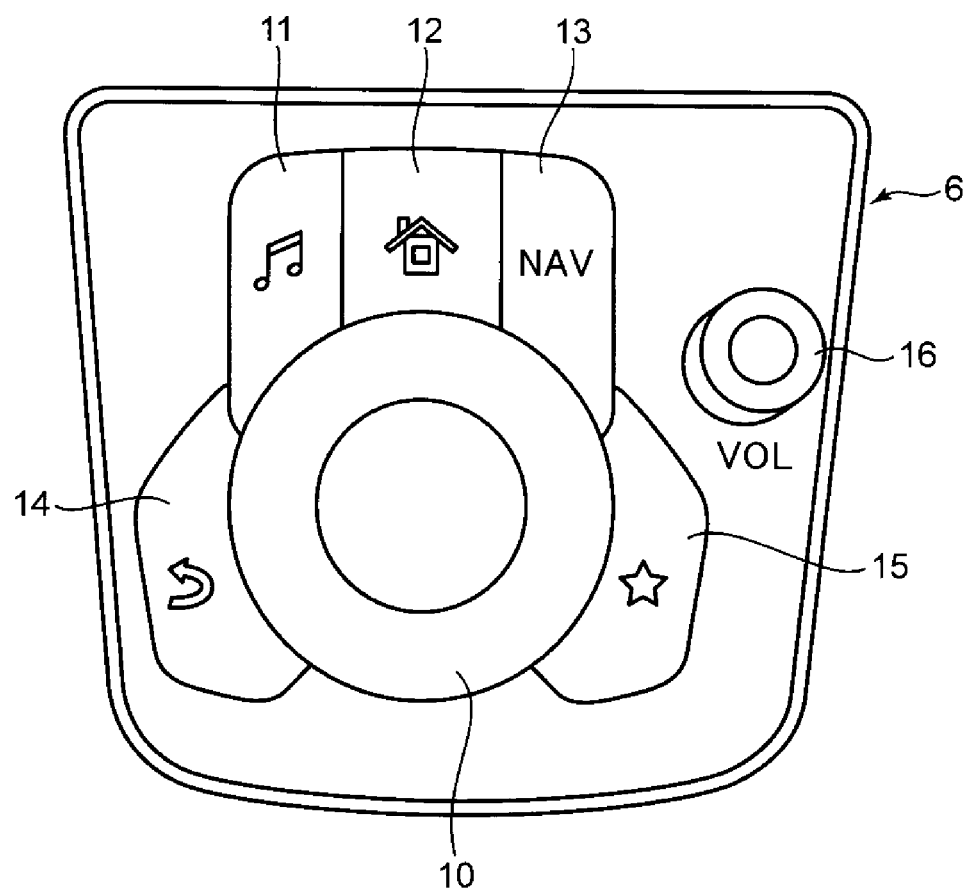
FIG. 2 is a plan view showing constitution of an operational portion.
Figure 3:
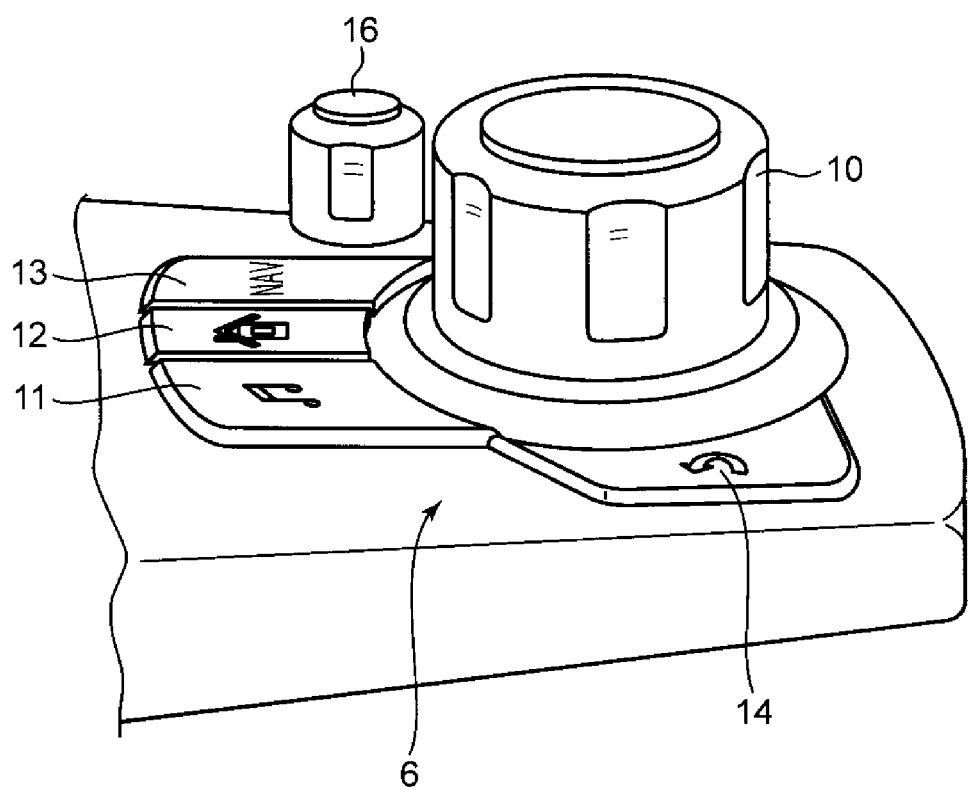
FIG. 3 is a perspective view of the operational portion.

FIGS. 2 and 3 are diagrams specifically showing the operational portion 6. As shown in these figures, the operational portion 6 comprises a dial switch 10, five pushing switches 11-15 which are provided around the dial switch 10, and a sound-volume adjusting switch 16 which is provided on the left-and-forward side of the dial switch 10.

The dial switch 10 is a columnar-shaped switch having a central axis extending vertically, which is configured to have three operations, that is—it is operative to be rotated around the central axis clockwise and counterclockwise, tilted longitudinally or laterally and also pushed down. The dial switch 10 has a diameter of about 4-6 cm and a height (a projecting height from a base face of the operational portion 6) of about 2-3 cm so that it can be easily rotated by three fingers of a thump, a forefinger and a middle finger.

The pushing switches 11-15 are a plate-shaped switch having a flat face, which are operative to be pushed down, respectively. The pushing switches 11-15 are configured such that each height is sufficiently small (about 2-5 mm, for example), compared with the dial switch 10 or the sound-volume adjusting switch 16. Further, each of the pushing switches 11-15 is configured to have a properly-wide surface area, such as about 1.5-2.0 cm in width and 2-3 cm in length, so that each switch can be easily pushed down by a single finger.

The pushing switches 11-15 may be divided into the three front-side pushing switches 11-13 and the two rearward-positioned pushing switches 14, 15. The three pushing switches 11-13 are arranged laterally in front of and near the dial switch 10. The two pushing switches 14, 15 are arranged on both sides of the dial switch 10 each. Hereinafter, these switches will be respectively referred to as a "left pushing switch" for the front-and-left pushing switch 11, a "right pushing switch" for the front-and-right pushing switch 13, a "central pushing switch" for the pushing switch 12 positioned between the pushing switches 11, 13, a "first rear pushing switch" for the rear-and-left pushing switch 14, and a "second rear pushing switch" for the rear-and-right pushing switch 15.

The three front pushing switches, i.e., the left, central and right pushing switches 11-13, are arranged in an arc shape around the dial switch 10. Specifically, respective rear side portions of the pushing switches 11-13 are formed in an arc shape so as to correspond to a peripheral face of the dial switch 10 as a whole, whereas respective front side portions of the pushing switches 11-13 are formed in a gentle (with a large radius) arc shape as a whole.

Further, the left, central and right pushing switches 11-13 are configured in different shapes so that the driver (operator) can recognize an arrangement of these switches without seeing these switches (just with the sensibility of the driver's finger tips). Specifically, the width of the central pushing switch 12 is set to be wider than those of the pushing switches 11, 13, and the height of at least a portion of the central pushing switches 12 is set to be greater than those of the pushing switches 11, 13 so that there can exist a difference in level between the respective switches.

The sound-volume adjusting switch 16 is another columnar-shaped switch having a central axis extending vertically, which is operative to be rotated around the central axis clockwise and counterclockwise only. The sound-volume adjusting switch 16 has a smaller diameter than the dial switch (about 1-2 cm, for example) so that it can be easily rotated by two fingers of a thump and a forefinger. Herein, the height of the sound-volume adjusting switch 16 is set substantially at the same as the dial switch (about 2-3 cm, for example).

Figure 4:
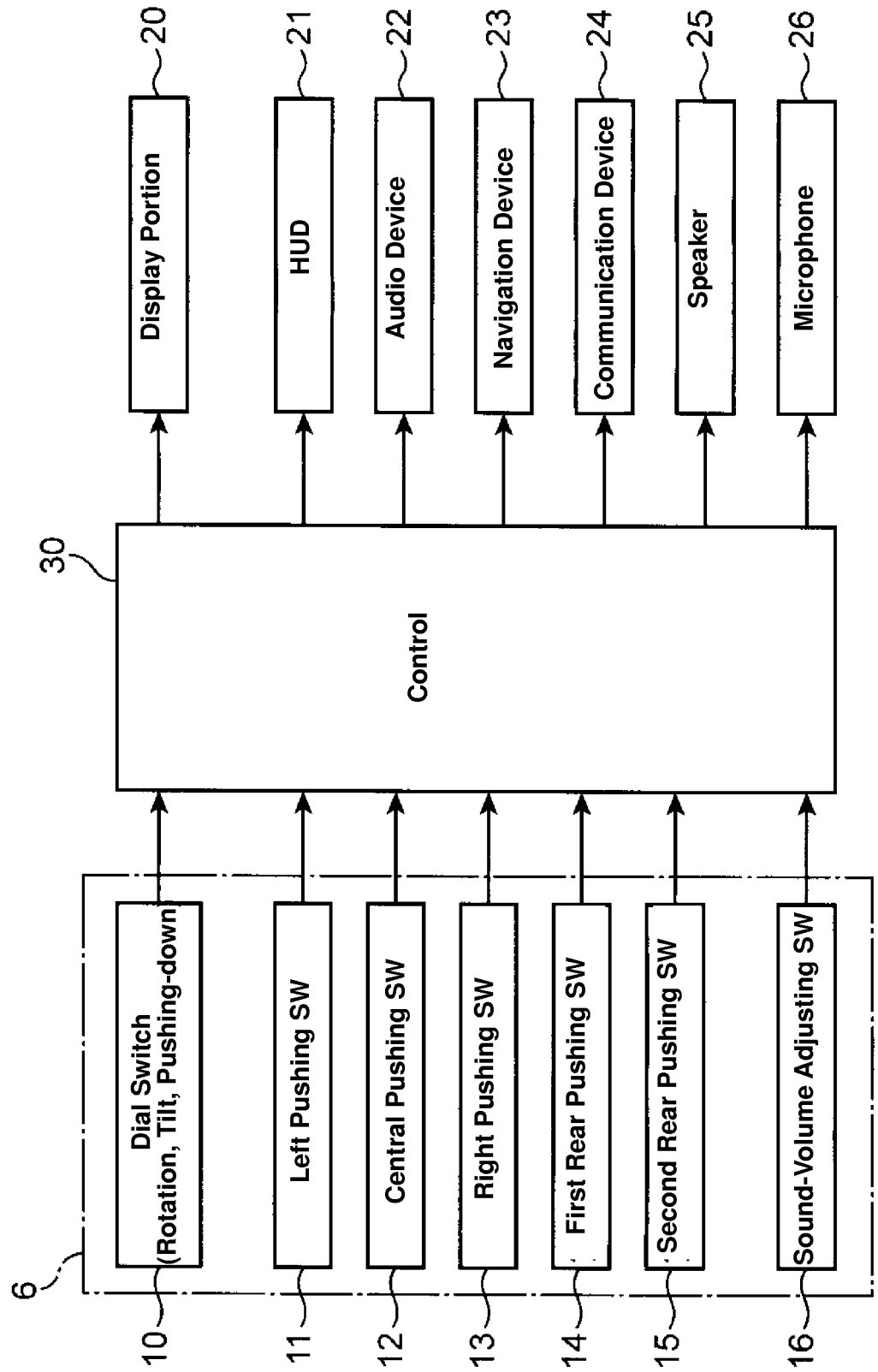
FIG. 4 is a block diagram showing a control system of the information display device.

FIG. 4 is a block diagram showing a control system of the information display device of the present embodiment. As shown in this figure, the vehicle is equipped with a controller (control portion) 30 which is comprised of a micro computer including well-known CPU, RAM, ROM and others. The controller 30 receives signals from plural points provided at the respective switches 10-16 of the operational portion 6, and obtains operational information of the switches based on the received input signals. Further, the controller 30 controls the various onboard apparatuses based on the obtained operational information, and displays information regarding the functions of the various onboard apparatuses on the display portion 20.

As shown in FIG. 4, the vehicle of the present embodiment is further equipped with a navigation device 23, a communication device 24, a speaker 25, and a microphone 26 in addition to the above-described HUD 21 and audio device 22.

The navigation device 23 is a device to conduct providing of road-map information and root guidance to destinations, which includes a receiver for GPS signals, memory of road-map information, a computing device to obtain desirable roots to destinations and others. The communication device 24 is a device to conduct communication processing of phone calls or e-mails for the outside, which exchanges various data, such as sound data, via a wireless network of a mobile phone, for example. The speaker 25 is a device to generate (reproduce) play sounds of the audio device 22, guidance sounds of the navigation device 23, sound signals received by the communication device 24 and the like. The microphone 26 is a device to transfer voice sounds of the driver to voice signals and transmit those to the communication device 24.

(2) Functions of Switches and Screen Display

Hereinafter, specific roles assigned to the respective switches 10-16 of the operational portion 6 and controls of the onboard apparatuses and the display of the display portion 20 in accordance with the operations of the switches 10-16 will be described.

The dial switch 10 functions as a multi-function key which selects one from plural selective items (icons, lines of letter, etc.) displayed on the display portion 20 and executes the function corresponding to the selected item. Herein, the above-described item selection is enabled by the rotational operation or the tilt operation of the dial switch 10, and the above-described function's execution is enabled by the pushing-down operation of the dial switch 10.

Both the left pushing switch 11 and the right pushing switch 13 function as a shortcut key which executes a specified function directly. Specifically, the left pushing switch 11 is the shortcut key to display an operational screen of the audio device 22 on the display portion 20, and the right pushing switch 13 is the shortcut key to display a navigation screen (road-map information around a vehicle's current location) based on the information provided by the navigation device 23 on the display portion 20.

The central pushing switch 12 functions as a home key to return the display of the display portion 20 to a highest-level menu screen.

The first rear pushing switch 14 functions as a key to return the display of the display portion 20 to a previous (last) screen.

The second rear pushing switch 15 is a favorite key to display a screen regarding a function previously registered by the driver on the display portion 20.

The sound-volume adjusting switch 16 is one to adjust a level of the reproduced sound which is outputted, via the speaker 25, from the audio device 22, the navigation device 23 or the like.

Figure 5:
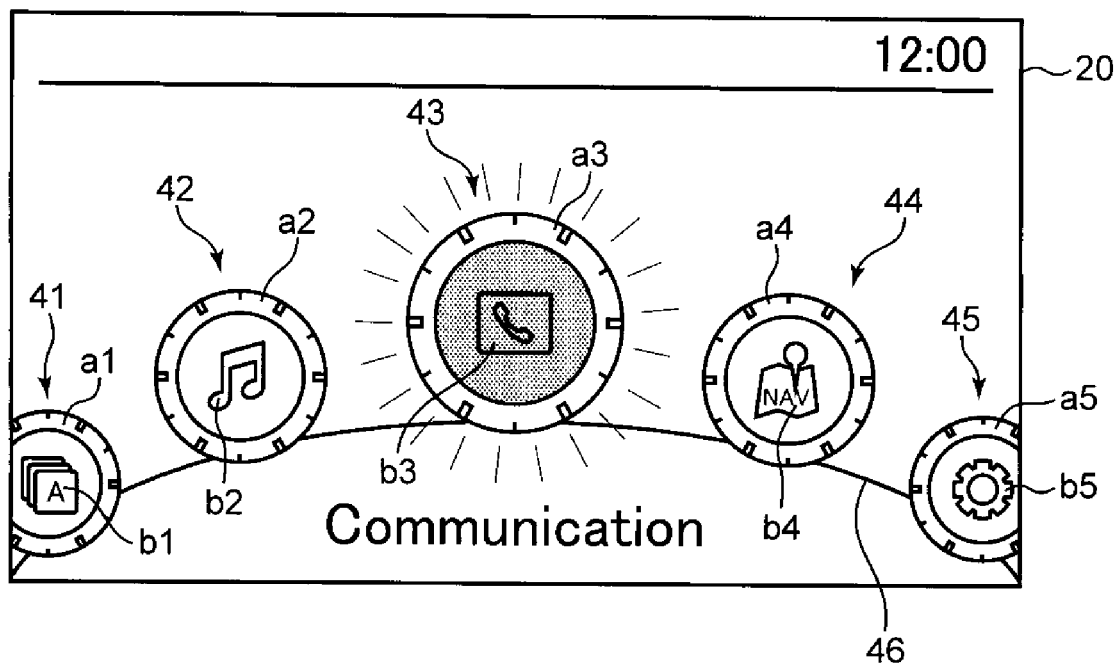
FIG. 5 is a diagram showing an example of a menu screen displayed on a display portion.

FIG. 5 shows the highest-level screen displayed on the display portion 20, i.e., contents of the menu screen. This menu screen displays, in total, five icons 41-45 which are positioned side by side substantially laterally. In the following descriptions, these five icons 41-45 will be sometimes referred to as a "central icon" for the icon 43 which is centrally positioned, a "left-central icon" for the icon 42 which is positioned on the left side of the icon 43, a "left-end icon" for the icon 41 which is positioned on the left side of the icon 42, a "right-central icon" for the icon 44 which is positioned on the right side of the icon 43, and a "right-end icon" for the icon 45 which is positioned on the right side of the icon 44.

The central icon 43 is displayed at a central position (in both lateral and height directions) of the screen of the display portion 20. The left-central icon 42 and the right-central icon 44 are displayed on the both sides of the central icon 43 and at slightly-downward positions from the central icon 43, respectively. Further, the left-end icon 41 and the right-end icon 45 are displayed on the both sides of the left-central icon 42 and the right-central icon 44 and at slightly-downward positions from these icons 42, 44, respectively. Additionally, a linear design 46 which projects upward in an arc shape is displayed at a lower portion of the menu screen so as to extend along an arrangement of the icons 41-45. In other words, the icons 41-45 are arranged in an arc shape along the linear design 46.

The respective icons 41-45 displayed on the above-described menu screen comprise ring-shaped peripheral designs a1-a5 and individual designs b1-b5 which are displayed inside the peripheral designs a1-a5, respectively. Rings of the peripheral designs a1-a5 have substantially a common design. The individual designs b1-b5 are comprised of figures and marks which mean the functions of the onboard apparatuses corresponding to the icons 41-45, respectively, so that these designs b1-b5 are unique.

The left-end icon 41 and the right-end icon 45 which are displayed at both ends of the screen are designed such that a portion of each of the peripheral designs a1, a5 is missing. For example, the left-end icon 41 is positioned at a left-end portion such that its entire part is not displayed, so that a left-end portion the peripheral design a1 is missing, and the right-end icon 45 is positioned at a right-end portion such that its entire part is not displayed, so that a right-end portion the peripheral design a5 is missing. Herein, the individual designs b1, b5 of these icons 41, 45 are designed such that their entire parts are displayed without being missing.

While it is not described specifically, it may be desirable, in order for the driver to recognize that the above-described unique display (i.e., missing display) of the icons 41, 45 is not caused by an error of the display portion 20, that gradation processing is applied to the left-end icon 41 and the right-end icon 45 such that indication brightness of respective end-side portions of the icons 41, 45 decreases gradually.

The icons 41-45 displayed on the menu screen are respectively associated with the functions of various onboard apparatuses, and any one of the icons is selected when execution of the function of the onboard apparatus corresponding to this selected one is desired. Specifically, according to the present embodiment, the function of pulling up applications preset in the controller 30 is assigned to the icon 41, the function of pulling up an operational screen of the audio device 22 is assigned to the icon 42, the function of pulling up an operational screen to conduct the communication processing of phone calls or e-mails by using the communication device 24 is assigned to the icon 43, the function of pulling up a navigation screen based on the information provided by the navigation device 23 is assigned to the icon 44, and the function of pulling up an operational screen to conduct various kinds of setting of the onboard apparatuses is assigned to the icon 45. As shown in FIG. 5, the respective individual designs b1-b5 of the icons 41-45 are set so that the correspondence of the respective functions can be properly recognized visually.

Herein, in the menu screen shown in FIG. 5, a selection indication to show which icon is selected is displayed, in addition to the above-described five icons 41-45. In the present embodiment, a highlight processing is applied to the selected icon as this selection indication. According to the highlight processing, the selected icon is illuminated by a light of specified color from its back side. In the example shown in FIG. 5, the selection indication is set at a position of the central icon 43 (i.e., the highlight processing is applied to the central icon 43). Thereby, the driver can easily recognize that the central icon 43 is selected (i.e., under selection). In the present embodiment, the concrete function corresponding to the selected icon is displayed in a lower area of the screen (below the linear design 46) with letter information, in addition to the above-described selection indication (highlight indication). When the central icon 43 is under selection as shown in FIG. 5, the letter information "Communication" is displayed to show the concrete function corresponding to the central icon 43 (the function of the communication processing of phone calls or e-mails). Moreover, in the present embodiment, the selected icon is displayed such that the size thereof is enlarged in addition to the above-described selection indication (highlight indication) in order to more clarify which icon is selected. In FIG. 5, the size of the central icon 43 which is under selection is enlarged compared with the other icons.

Figure 6A:
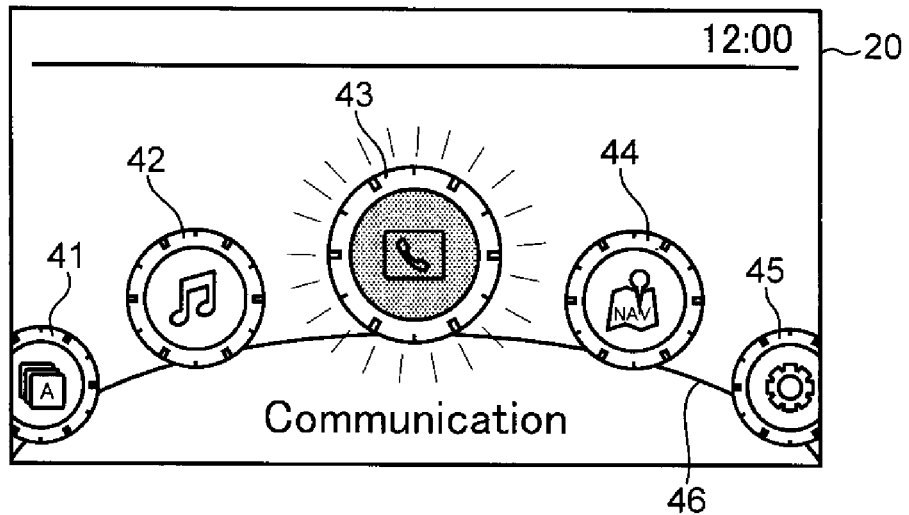
FIGS. 6A-6C are diagrams to explain changes of the menu screen when a dial switch of the operational portion is operated, which show states of a selection indication which is moved from a default position to the left.
Figure 6B:
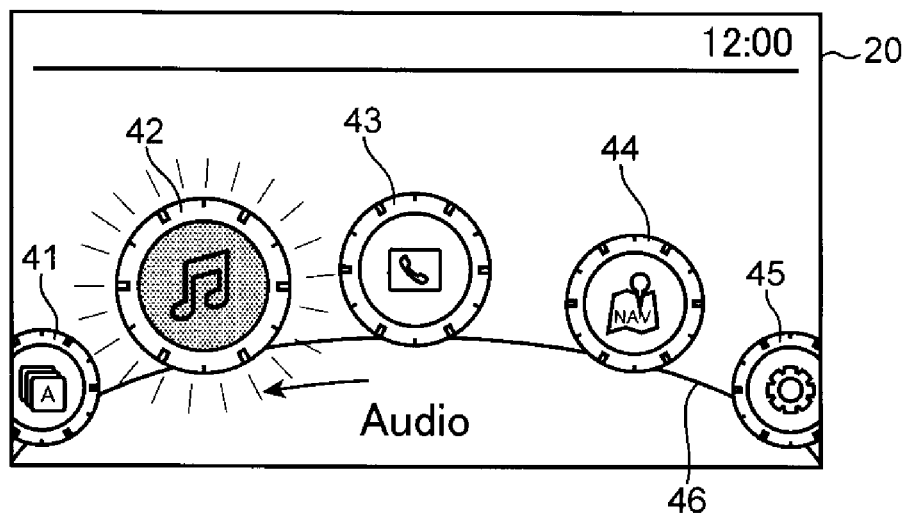
Figure 6C:
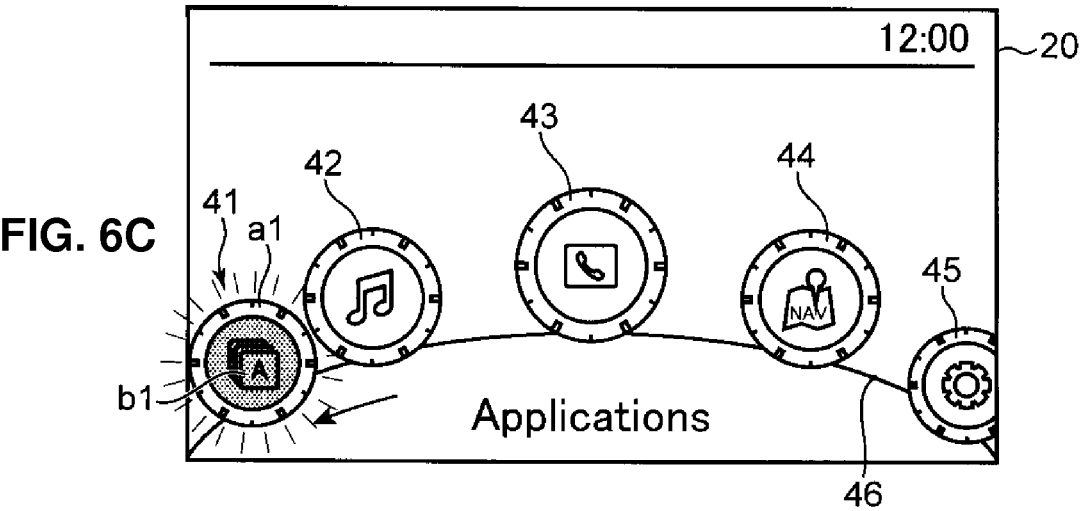
Figure 7A:
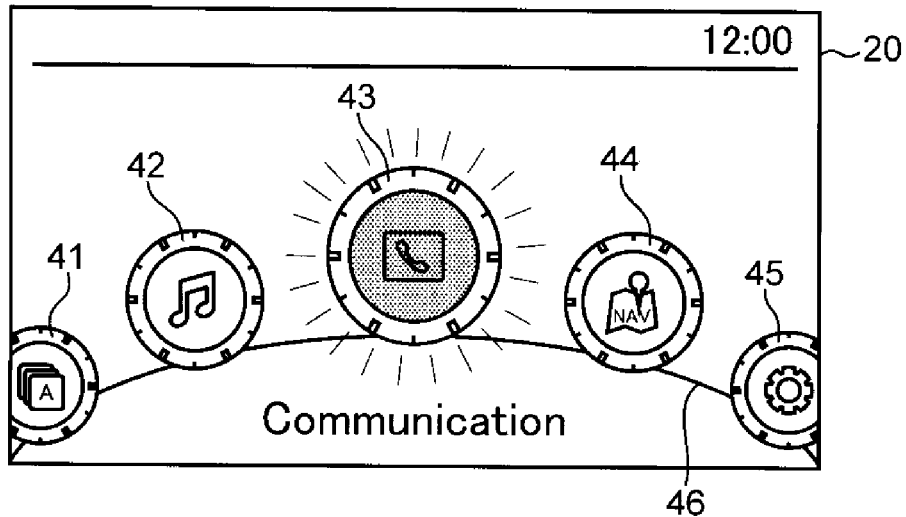
FIGS. 7A-7C are diagrams to explain changes of the menu screen when the dial switch of the operational portion is operated, which show states of the selection indication which is moved from the default position to the right.
Figure 7B:
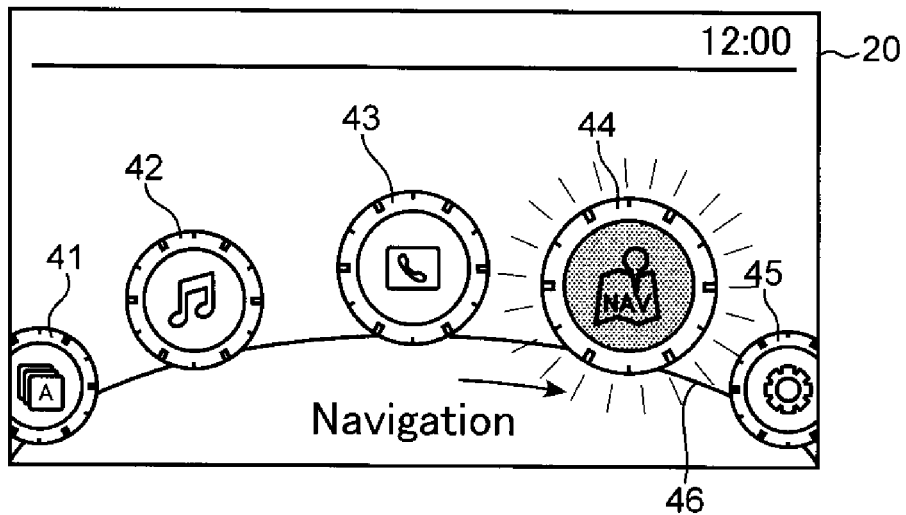
Figure 7C:
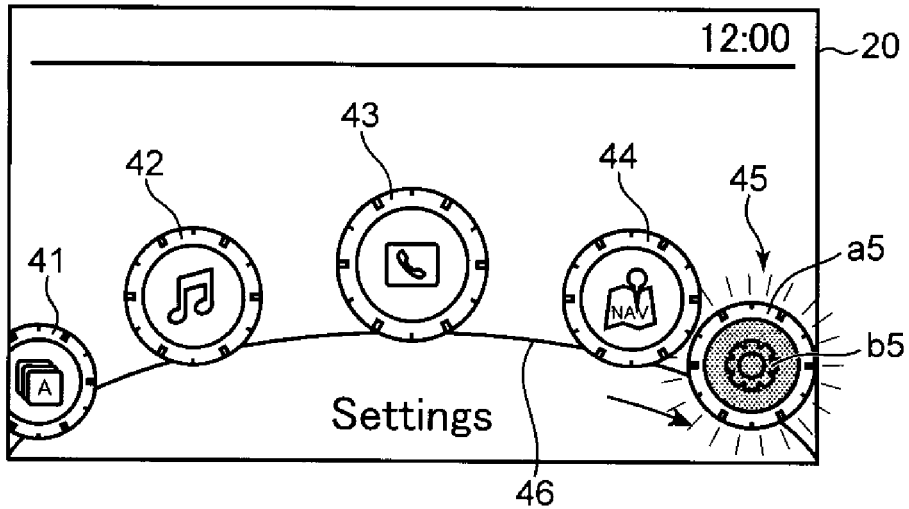

When the dial switch 10 is rotated or tilted laterally in a state in which the above-described menu screen is displayed on the display portion 20, the position of the above-described selection indication (highlight indication) is changed among the five icons 41-45. For example, when the dial switch 10 is rotated counterclockwise or tilted to the left in a state in which the icon 43 is selected, the position of the selection indication (highlight indication) is changed from the central icon 43 to the left-central icon 42, then the left-end icon 41 as shown in FIGS. 6A-6C. At the same time, the letter information to be displayed in the lower area of the screen is changed from "Communication" to "Audio," then to "Applications." To the contrary, when the dial switch 10 is rotated clockwise or tilted to the right in a state in which the icon 43 is selected, the position of the selection indication is changed from the central icon 43 to the right-central icon 44, then to the right-end icon 45 as shown in FIGS. 7A-7C. At the same time, the letter information to be displayed in the lower area of the screen is changed from "Communication" to "Navigation," then to "Settings."

Meanwhile, when the dial switch 10 is not rotated or tilted, the menu screen is configured such that the selection indication is positioned at the central icon 43 all the time (with the letter information of "Communication") as shown in FIG. 5 (or FIGS. 6A and 7A). That is, a default position of the selection indication of the present embodiment is at the central icon 43.

As shown in FIGS. 6A-6C and 7A-7C, when the position of the above-described selection indication is changed among the ions 41-45 in accordance with the rotational or tilt operation of the dial switch 10, the selection indication moves only basically on the display portion 20, without changing display positions of the icons 41-45. That is, the present embodiment is configured so that the drive can easily recognize which icon is selected by changing only the position of the selection indication, keeping the respective positions of icons 41-45 displayed on the display portion 20 fixed.

However, when the position of the selection indication is changed further to the left-end icon 41 or the right-end icon 45 which are located at the furthest-outside position on the menu screen (i.e., when any one of the icons 41, 45 is selected), the position of this icon displayed on the display portion 20 is moved slightly toward the center of the screen. For example, when the left-end icon 41 is selected on the menu screen, the display position of the left-end icon 41 is moved slightly toward the center of the screen (to the right), compared with a case of non-selection, as shown in FIG. 6C. Accordingly, the entire part of the left-end icon 41, the left-end portion of the peripheral design a1 of which has been missing in the case of non-selection, comes to be displayed on the display portion 20, so that both the peripheral design a1 and the individual design b1 appear wholly. Likewise, when the right-end icon 45 is selected on the menu screen, the display position of the right-end icon 45 is moved slightly toward the center of the screen (to the left), compared with a case of non-selection, as shown in FIG. 7C. Accordingly, the entire part of the left-end icon 45, the right-end portion of the peripheral design a5 of which has been missing in the case of non-selection, comes to be displayed on the display portion 20, so that both the peripheral design a5 and the individual design b5 appear wholly.

Herein, it is not necessary that the entire part of the icons 41, 45 come to be displayed perfectly, but it may be fine that an area of the missing part of those after moving of the display position of the icons 41, 45 just decreases.

As shown in FIGS. 6C and 7C, when the selected left-end and right-end icons 41, 45 are moved toward the center of the screen, this moving is conducted along the arc-shaped linear design 46. Herein, since the size of the icons is enlarged in addition to the above-described moving in the present embodiment, the icons can be more active, so that the icons can be recognized more easily.

While the icons 41, 45 are moved when selected as described above, the three icons centrally positioned on the screen, i.e., the left-central icon 42, the central icon 43, and the right-central icon 44, are configured such that their entire parts are displayed originally. Accordingly, the display positions of these icons 42-43 are not be moved when selected (however, a display area of the respective icons changes according to enlargement processing at the time of selection).

Figure 8A:
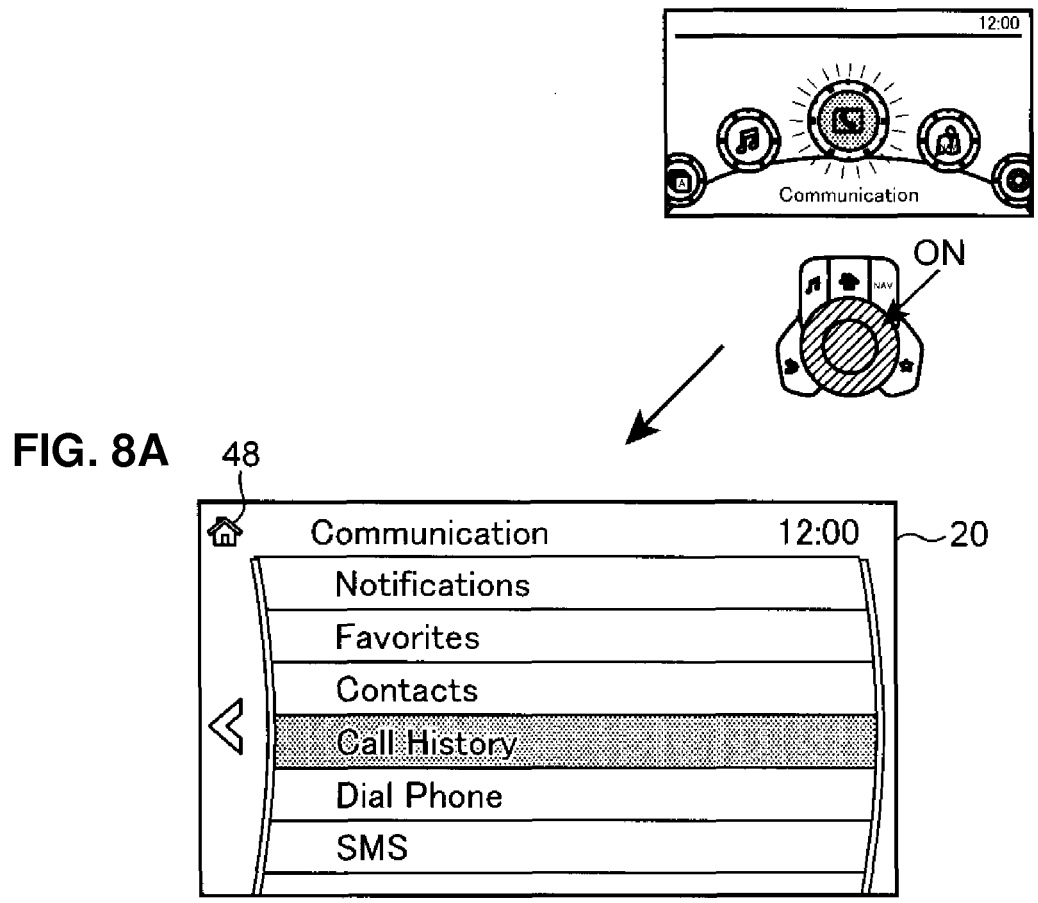
FIGS. 8A and 8B are diagrams to explain an example of an operational screen for communication displayed on the display portion.

FIG. 8A shows an operational screen for communication processing displayed on the display portion 20. This screen is displayed when the dial switch 10 is pushed down in a state in which the central icon 43 is selected on the menu screen. Specifically, in the operational screen of FIG. 8A, plural selective items of "Notifications," "Favorites" and so on are displayed on the display portion 20.

Figure 8B:
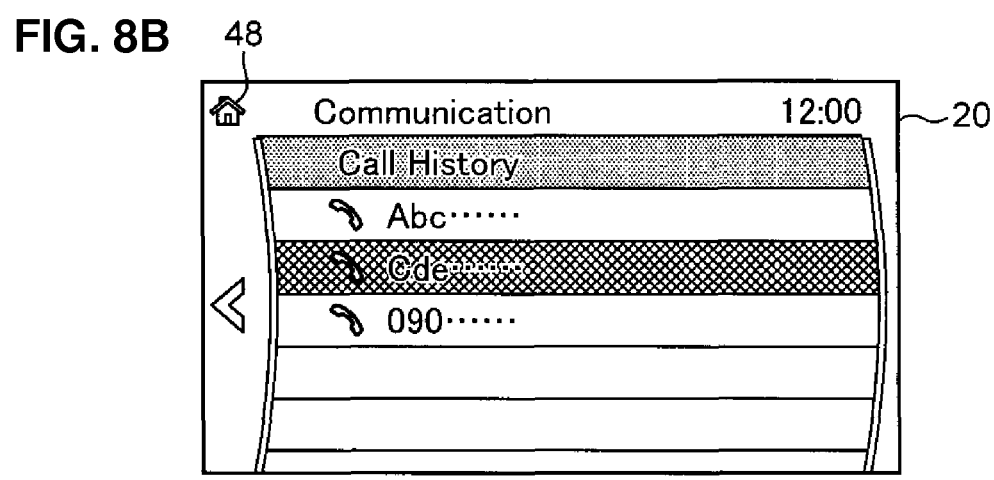

The driver can select any specified item from the above-described selective items and execute the specified item by operating the dial switch 10 in the above-described state. That is, the driver can change selective items by rotating or vertically tilting the dial switch 10, and pull up any low-level operational screen corresponding to the selected item by pushing down the dial switch 10. FIG. 8B shows a state in which the item of "Call History" of FIG. 8A is selected and executed. In this case, information regarding the name, the phone number and others of all of persons whom the drive has called so far is displayed as a call history when the item of "Call History" is selected and executed. Herein, if the name of the person who the driver is going to call is found in this information, the driver can make a phone call to this person by selecting and executing this item.

Herein, the icon 48 displayed at the upper left of the screen of FIGS. 8A and 8B is one for returning to the menu screen shown in FIG. 5 and others. The display of the display portion 20 can be returned to the above-described menu screen by the driver's selecting the icon 48 through the rotational or tilt operation of the dial switch 10 and then pushing down the dial switch 10. This is the same in FIGS. 9-12 which will be described below.

FIG. 9A shows an operational screen of the audio device 22 displayed on the display portion 20. This screen is displayed when the dial switch 10 is pushed down in a state in which the left-central icon 42 is selected on the menu screen, or when the left-side pushing switch 11 is pushed down. Herein, when the left-side pushing switch 11 is pushed down, the operational screen of the audio device 22 is pulled up regardless of the previous (last) display state of the display portion 20. Specifically, in the operational screen of FIG. 9A, plural selective items of "FM," "AM," "CD," "DVD," and "TV" are displayed on the display portion 20.

The driver can select any specified item from the above-described selective items and execute the specified item by operating the dial switch 10 in the above-described state. That is, the driver can change selective items by rotating or vertically tilting the dial switch 10, and pull up any low-level operational screen corresponding to the selected item by pushing down the dial switch 10. FIG. 9B shows a state in which the item of "FM" of FIG. 9A is selected and executed. In this case, some information including a frequency of an FM broadcast which is currently received and the like is displayed when the item of "FM" is selected and executed. Herein, the frequency of the FM broadcast is changeable through the rotational operation of the dial switch 10.

Figure 10:
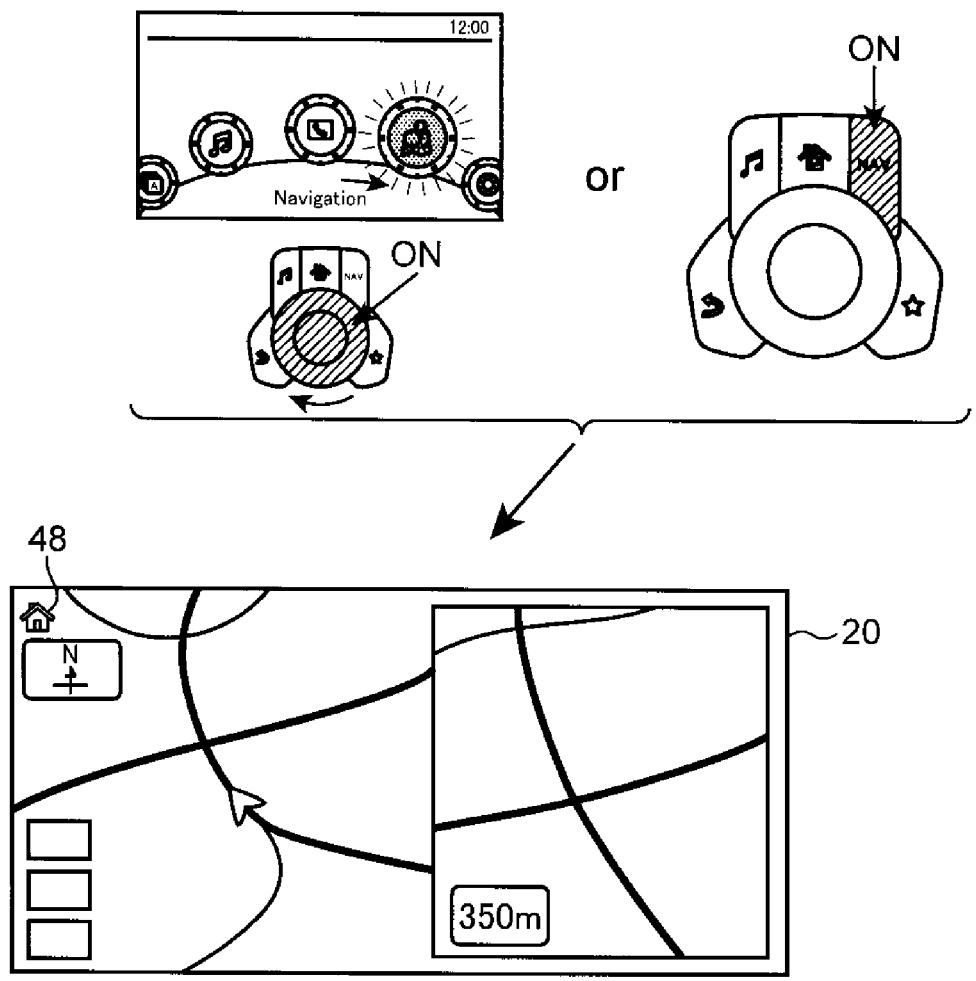
FIG. 10 is a diagram to explain an example of a navigation screen displayed on the display portion.

FIG. 10 shows briefly a navigation screen displayed on the display portion 20. This screen is displayed when the dial switch 10 is pushed down in a state in which the right-central icon 44 is selected on the menu screen, or when the right-side pushing switch 13 is pushed down. Herein, when the right-side pushing switch 13 is pushed down, the above-described navigation screen is pulled up regardless of the previous (last) display state of the display portion 20. Specifically, in the navigation screen of FIG. 10, the road-map information in a specified area around the vehicle's current location is displayed at any time based on some data (GPS position information and others) provided by the navigation device 23, for example. While illustration is omitted here, setting of destinations, selection of desirable roots and the like can be executed by operating the dial switch 10 in a state in which the above-described navigation screen is displayed.

Figure 11A:
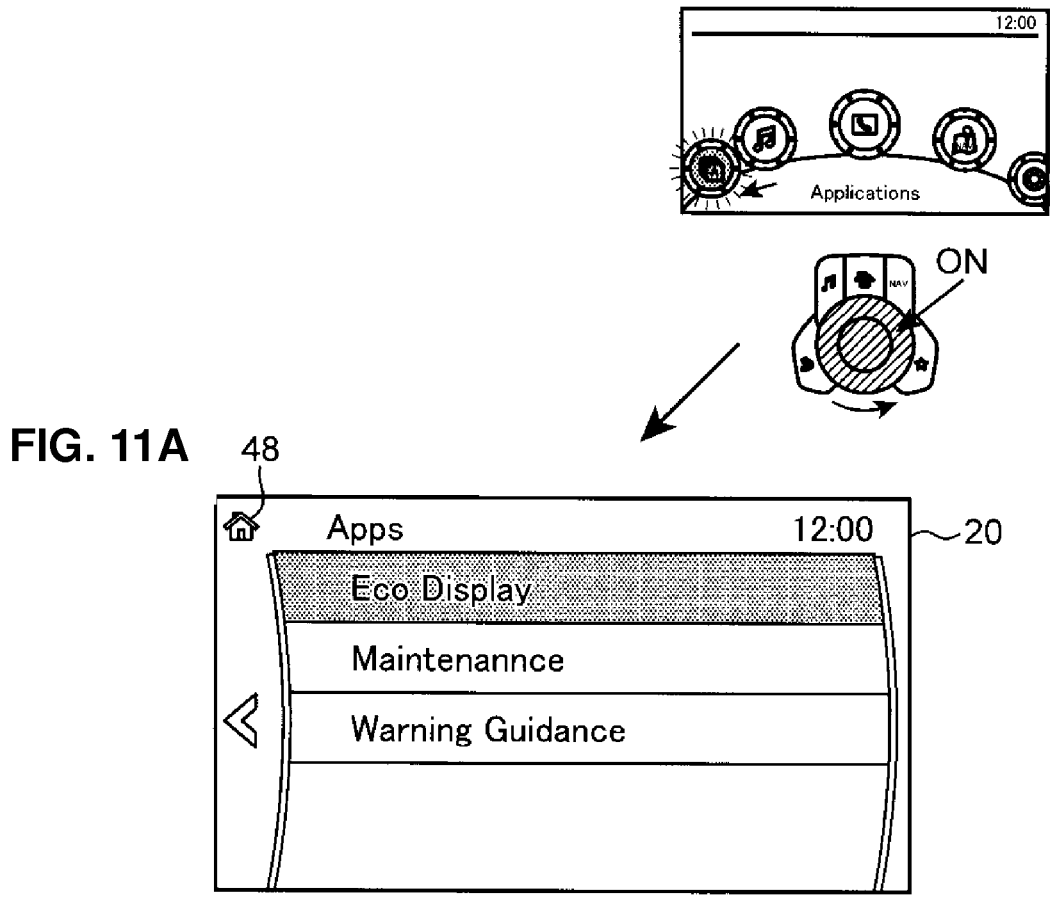
FIGS. 11A and 11B are diagrams to explain an example of a screen for execution of applications displayed on the display portion.

FIG. 11A shows a screen for execution of applications displayed on the display portion 20. This screen is displayed by pushing down the dial switch 10 in a sate in which the left-end icon 41 is selected on the menu screen. Specifically, in the operational screen of FIG. 11A, plural selective items of "Eco Display," "Maintenance," and "Warning Guidance" are displayed on the display portion 20.

Figure 11B:
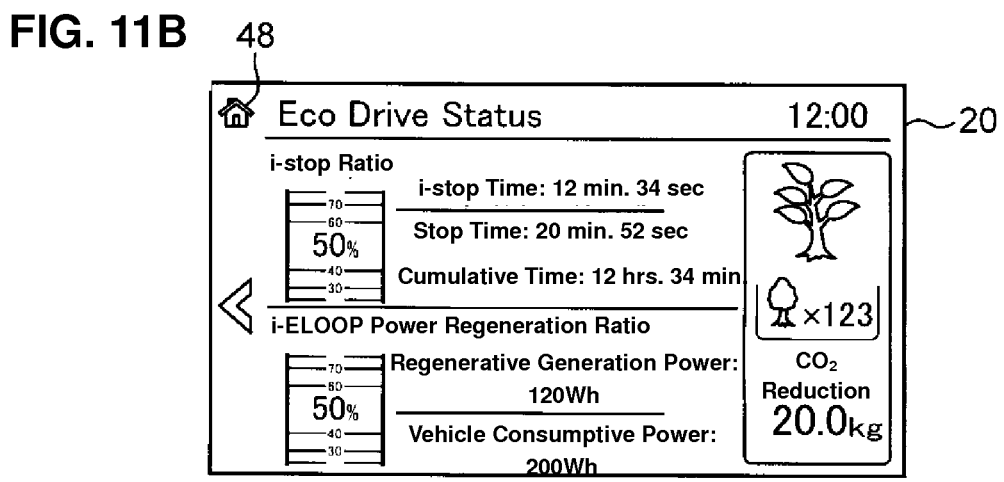

The driver can select any specified item from the above-described selective items and execute the specified item by operating the dial switch 10 in the above-described state. For example, the item of "Eco Display" is selected and executed, some eco-information, such as an idling stop (i-stop) and deceleration regeneration (i-ELOOP), is displayed as shown in FIG. 11B.

Figure 12:
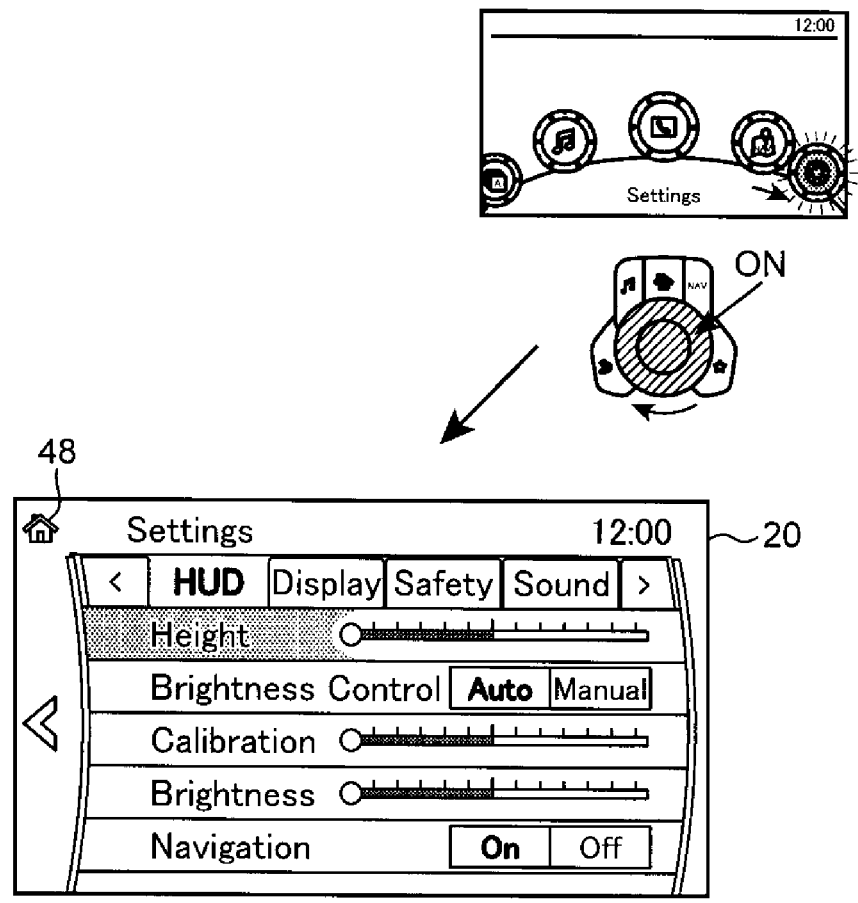
FIG. 12 is a diagram to explain an example of a screen for setting displayed on the display portion.

FIG. 12 shows a screen for setting displayed on the display portion 20. This screen is displayed when the dial switch 10 is pushed down in a state in which the right-end icon 45 is selected on the menu screen. Specifically, items for setting of various components, such as the HUD 21, the display portion 20, and the speaker 25, are displayed on the screen for setting of FIG. 12. Further, selection of desirable components and changing of setting values of the selected component (the height of the HUD 21, for example) can be executed by operating the dial switch 10 and the like in a state in which the above-described screen is displayed.

(3) Control Steps

Hereinafter, specific steps of a display control of the display portion 20 which is executed by the controller 30 will be described referring to flowcharts of FIGS. 13 and 14. When control steps of the flowchart of FIG. 13 start by switching on an ignition switch, not illustrated, which is provided at the instrument panel 1 and the like, the controller 30 executes processing of displaying the menu screen on the display screen 20 (step S1). Herein, this screen is the default-state menu screen which is shown in FIG. 5 (or FIG. 6A or FIG. 7A). Accordingly, the position of the selection indication (highlight indication) to show which icon of the plural icons 41-45 is selected on the menu screen is set at the central icon 43 which is positioned at the center of the screen.

Next, the controller 30 executes processing of determining whether or not the dial switch 10 is rotated or tilted based on the signal from the point for the dial switch 10 which is provided at the operational portion 6 (step S2).

When the determination in the step S2 is YES and accordingly it has been confirmed that the dial switch 10 is rotated or tilted, the controller 30 executes processing of changing the position of the selection indication (highlight indication) among the icons 41-45 as shown in FIG. 6A-6C or 7A-7C (step S3). That is, when the dial switch 10 is rotated counter-clockwise or tilted to the left, the position of the selection indication is changed to the left, whereas when the dial switch 10 is rotated clockwise or tilted to the right, the position of the selection indication is moved to the right. Herein, a position changing distance of the selection indication (i.e., how far (to which advanced-icon) the position of the selection indication is changed) may be properly set based on a rotational angle or a tilting frequency of the dial switch 10.

Subsequently, the controller 30 executes processing of determining whether or not the left-end icon 41 or the right-end icon 45 is selected (i.e., whether or not the position of the selection indication is set at the left-end icon 41 or the right-end icon 45) (step S4).

When the determination in the step S4 is YES and accordingly it has been confirmed that the left-end icon 41 or the right-end icon 45 is selected, the controller 30 executes processing of moving the display position of this icon so that its entire part can be displayed on the display portion 20 (step S5). For example, when the left-end icon 41 is selected, the display position of the left-end icon 41 is moved slightly to the right as shown in FIG. 6C, so that the entire part of the peripheral design a1 and the individual design b1 of the left-end icon 41 can be fully displayed on the display portion 20. Meanwhile, when the right-end icon 41 is selected, the display position of the right-end icon 45 is moved slightly to the left as shown in FIG. 7C, so that the entire part of the peripheral design a5 and the individual design b5 of the right-end icon 45 can be fully displayed on the display portion 20.

Then, the control of a case in which the determination in the above-described step S2 is NO, that is—the dial switch 10 is not rotated or tilted, will be described. In this case, the controller 30 executes processing of determining whether or not the dial switch 10 is pushed down based on the signal from the point for the dial switch 10 (step S6).

When the determination in the step S6 is YES and accordingly it has been confirmed that the dial switch 10 is pushed down, the controller 30 executes processing of displaying information regarding the function corresponding to the icon which has been selected right before the pushing down of the dial switch 10 (step S7). For example, when the dial switch 10 is pushed down in a state in which the central icon 43 is selected, the operational screen for transmission shown in FIG. 8A is displayed on the display portion 20.

Figure 14:
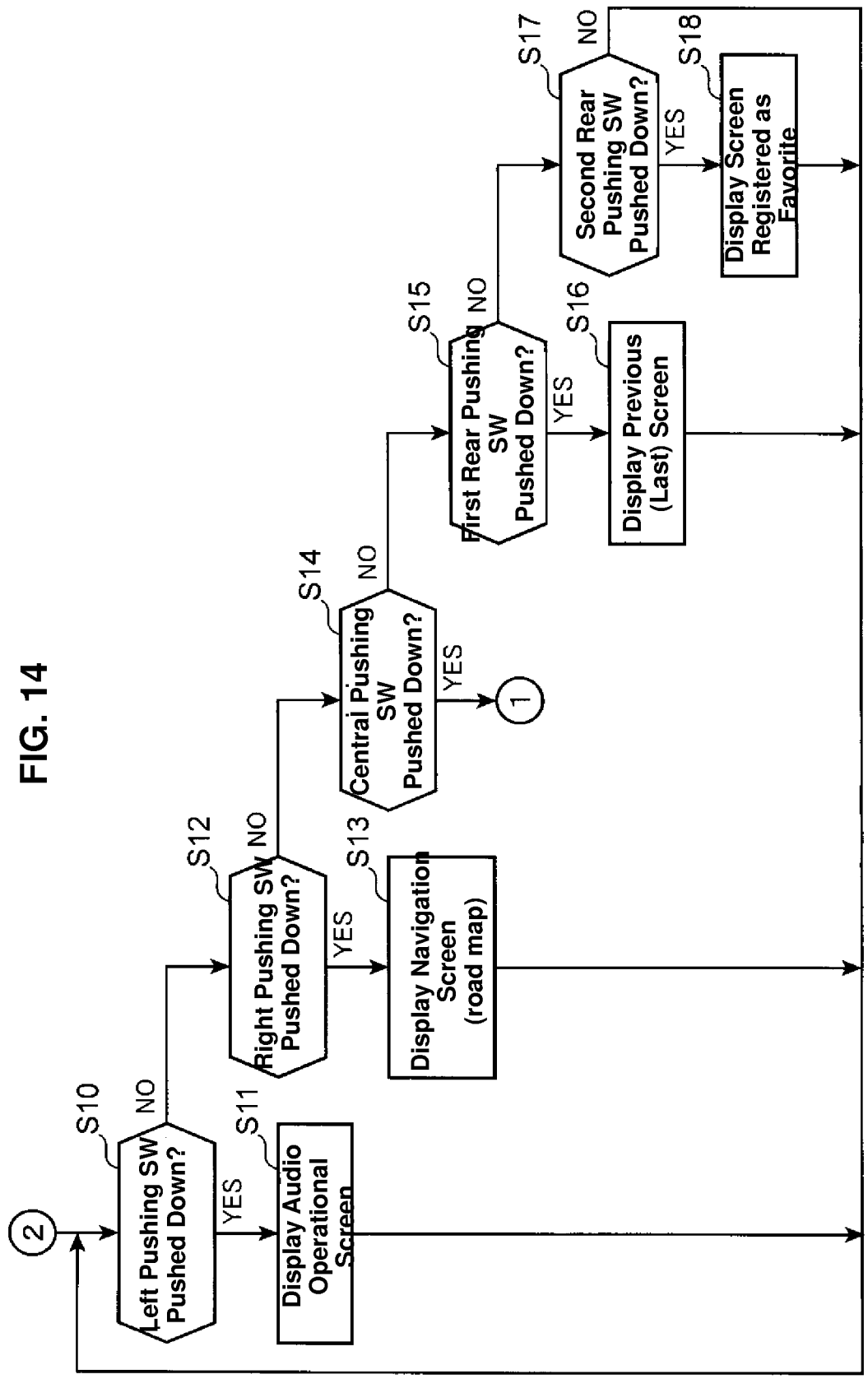
FIG. 14 is another flowchart (part 2) showing the specific steps of the indication control of the display portion.

When the above-described determination in the step S6 is NO or the processing of the above-described step S7 is complete, the control moves to processing shown in the flowchart of FIG. 14. Herein, the controller 30 executes processing of determining whether or not the left pushing switch 11 is pushed down based on the signal from the point for the left pushing switch 11 provided at the operational portion 6 (step S10).

When the determination in the step S10 is YES and accordingly it has been confirmed that the left pushing switch 11 is pushed down, the controller 30 executes processing of displaying the operational screen of the audio device 22 (see FIG. 9A) on the display portion 20 (step S11). Herein, while illustration of processing in this flowchart is omitted, in a case in which further operation is applied to the dial switch 10 and the like after the step S11, processing of displaying the display portion 20 or controlling the audio device 22 is executed in accordance with this further operation. For example, in a case in which the operation of selecting and executing the "FM" as an audio source, a FM tuner installed in the audio device 22 is activated and information (frequency and the like) of the tuned FM broadcast is displayed (see FIG. 9B).

Meanwhile, when the above-described determination in the step S10 is NO (that is—when the left pushing switch 11 is not pushed down), the controller 30 executes processing of determining whether or not the right pushing switch 13 is pushed down based on the signal from the point for the left pushing switch 13 provided at the operational portion 6 (step S12).

When the determination in the step S12 is YES and accordingly it has been confirmed that the right pushing switch 13 is pushed down, the controller 30 executes processing of displaying the road map information shown in FIG. 10, for example, as the navigation screen provided by the navigation device 23 on the display portion 20 (step S13). Herein, while illustration of processing in this flowchart is omitted, in a case in which further operation is applied to the dial switch 10 and the like after the step S13, processing of displaying the display portion 20 or controlling the navigation device 23 is executed in accordance with this further operation.

When the above-described determination in the step S12 is NO (that is—when the right pushing switch 13 is not pushed down), the controller 30 executes processing of determining whether or not the central pushing switch 12 is pushed down based on the signal from the point for the central pushing switch 12 provided at the operational portion 6 (step S14).

Figure 13:
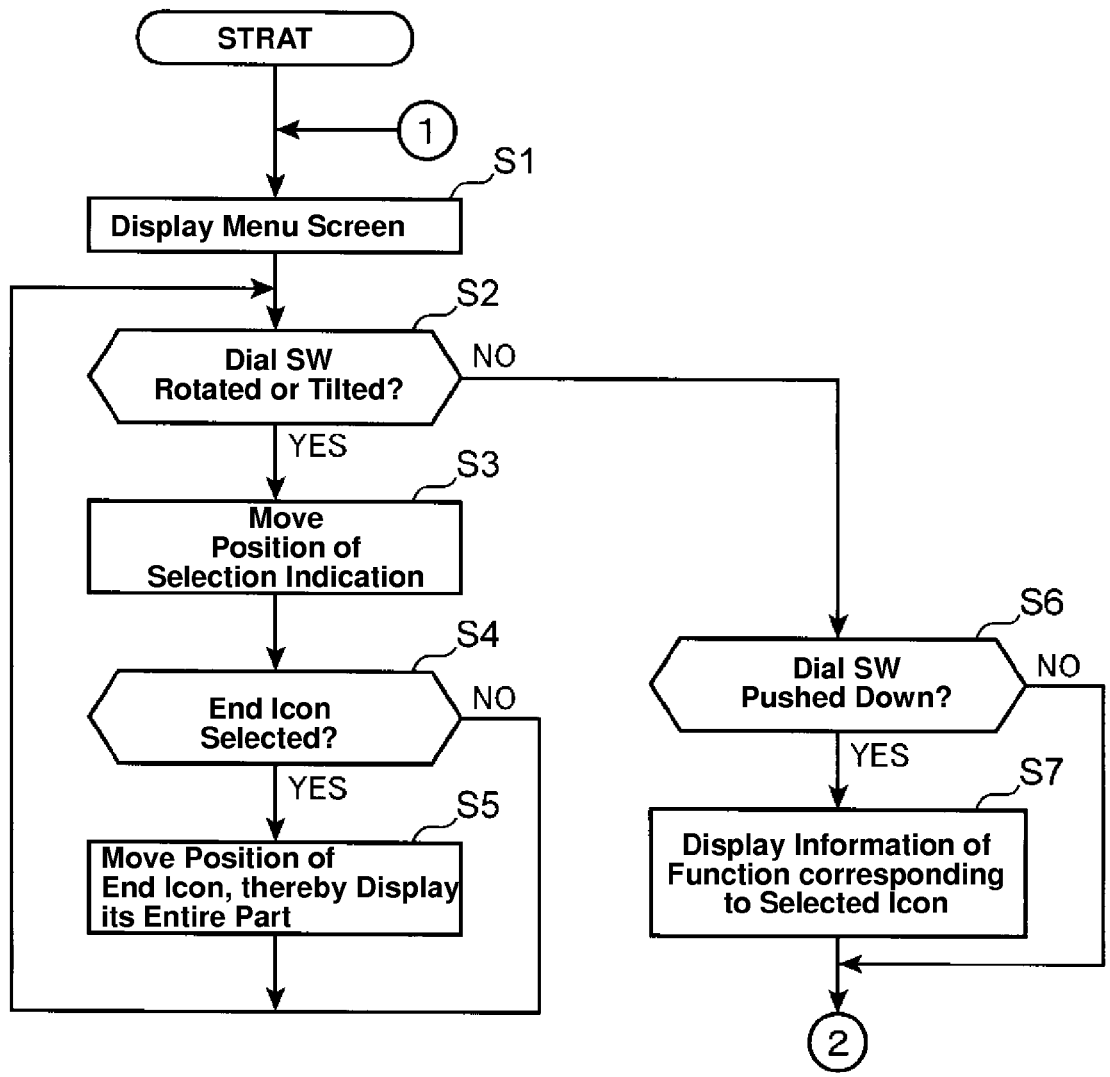
FIG. 13 is a flowchart (part 1) showing specific steps of an indication control of the display portion.

When the determination in the step S14 is YES and accordingly it has been confirmed that the central pushing switch 12 is pushed down, the control proceeds to the step S1 of FIG. 13, where the controller 30 executes processing of displaying the default-state menu screen shown in FIG. 5 (or FIG. 6A or FIG. 7A) on the display portion 20.

Meanwhile, when the above-described determination in the step S14 is NO (that is—when the central pushing switch 12 is not pushed down), the controller 30 executes processing of determining whether or not the first rear pushing switch 14 is pushed down based on the signal from the point for the first rear pushing switch 14 provided at the operational portion 6 (step S15).

When the determination in the step S15 is YES and accordingly it has been confirmed that the first rear pushing switch 14 is pushed down, the controller 30 executes processing of returning the display of the display portion 20 to the previous (last) screen (step S16). For example, when the first rear pushing switch 14 is pushed down in a case in which the low-level audio operational screen shown in FIG. 9B, the highest-level audio operational screen (the selection screen of the audio source in the present embodiment) shown in FIG. 9A is displayed as the previous (last) screen.

Meanwhile, when the above-described determination in the step S15 is NO (that is—when the first rear pushing switch 14 is not pushed down), the controller 30 executes processing of determining whether or not the second rear pushing switch 15 is pushed down based on the signal from the point for the second rear pushing switch 15 provided at the operational portion 6 (step S17).

When the determination in the step S17 is YES and accordingly it has been confirmed that the second rear pushing switch 15 is pushed down, the controller 30 executes processing of displaying a specified screen which is registered in advance as a favorite of the driver on the display portion 20 (step S18). For example, in a case in which the information screen regarding the idling stop, the deceleration regeneration shown in FIG. 11B and the like is registered as the favorite, the display of the display portion 20 changes to the screen of FIG. 11B directly through an pushing-down operation of the second rear pushing switch 15.

(4) Operations Etc.

As described above, the information display device for a vehicle of the present embodiment which displays the various kinds of information in accordance with the operation of the operational portion 6 comprises the following distinctive constitutions.

The plural icons 41-45 positioned side by side substantially laterally are displayed on the display portion 20, together with the selection indication (the highlight indication in the present embodiment) to show which icon is selected, as the menu screen for selecting the functions of the various onboard apparatuses. When the dial switch 10 of the operational portion 6 is rotated or tilted in a state in which the above-described menu screen is displayed, the position of the selection indication is changed among the respective icons 41-45 (see FIGS. 6 and 7). Meanwhile, in the default-state in which the dial switch 10 is not operated, the position of the selection indication is set at the central icon 43 which is positioned at the center of the screen (see FIGS. 6A and 7A). Then, the dial switch 10 is further pushed down in a state in which the menu screen is displayed, the information regarding the function of the onboard apparatus corresponding to the selected icon (i.e., the icon with the selection indication) is displayed on the display portion 20 (see FIGS. 8-12).

The central pushing switch 12 and the left and right pushing switches 11, 13 positioned on the both side of the central pushing switch 12 are provided in front of and near the dial switch 10. The central pushing switch 12 functions as the home key to display the above-described default-state menu screen on the display portion 20 whenever the central pushing switch 12 is pushed down, regardless of the display state of the display portion 20 right before the pushing-down operation of the central switching switch 12. Meanwhile, the left or right pushing switches 11, 13 functions as the shortcut key to display the information regarding the function of the onboard apparatus corresponding to the left-positioned or right-positioned icon (the left-central icon 42 or the right-central icon 44), specifically the audio operational screen shown in FIG. 9A or the navigation screen shown in FIG. 10, on the display portion 20 whenever the left or right pushing switches 11, 13 is pushed down, regardless of the display state of the display portion 20 right before the pushing-down operation of the central left or right pushing switches 11, 13.

According to the above-described embodiment, there can be two operational ways to execute the respective functions corresponding to the left-central icon 42 and the right-central icon 44. One of the operational ways is to select any one of the above-described both icons 42, 44 through the operation of rotation or tilt of the dial switch 10 when the menu screen is displayed on the display portion 20 (that is—to change the position of the selection indication to any one of the both icons 42, 44), then to push down the dial switch 10. The other way is to push down the left pushing switch 11 or the right pushing switch 13. According to the above-described other way, the desired function can be executed directly whenever the left pushing switch 11 or the right pushing switch 13 is pushed down, regardless of the previous (last) display state of the display portion 20, so that an operational process can be facilitated and an operational speed can be properly increased. Further, the three icons and the three pushing switches are associated with each other such that the function of the onboard apparatus corresponding to the left-central icon 42 is associated with the function executed by pushing down the left pushing switch 11, whereas the function of the onboard apparatus corresponding to the right-central icon 44 is associated with the function executed by pushing down the right pushing switch 13. The driver can intuitively recognize which pushing switch of the left or right pushing switches 11, 13 is to be pushed down for executing the function desired by the driver, so that the superior operability can be obtained.

Herein, it may be considered that the central pushing switch 12 positioned between the left and right pushing switches 11, 13 is configured to function as a shortcut key to directly execute the function of the onboard apparatus corresponding to the central icon 43 positioned at the center of the screen. However, the present embodiment is configured such that the central icon 43 is selected when the menu screen is in the default state, so that the function of the onboard apparatus corresponding to the central icon 43 (the function to conduct operations of phone calls or e-mails) can be executed basically only by pressing down the dial switch 10. Herein, if the central pushing switch 12 was provided so as to function as the above-described shortcut key, the same function could be possibly executed by pushing any of the dial switch 10 and the central pushing switch 12, so that the significance of existence of the central pushing switch 12 could be lessened.

By contrast, the present embodiment is configured such that the central pushing switch 12 functions as the home key to display the default-state menu screen on the display portion 20, so that improper duplication of the function of the dial switch 10 and the function of the central pushing switch 12 can be avoided. Accordingly, even if the home key which may be used often is provided, the increase of the number of pushing switches can be properly restrained. Thereby, the desired functions of the onboard apparatuses can be properly assigned to the smaller number of pushing switches, so that the operational portion 6 can be properly compact and the operability can be improved.

Figure 15:
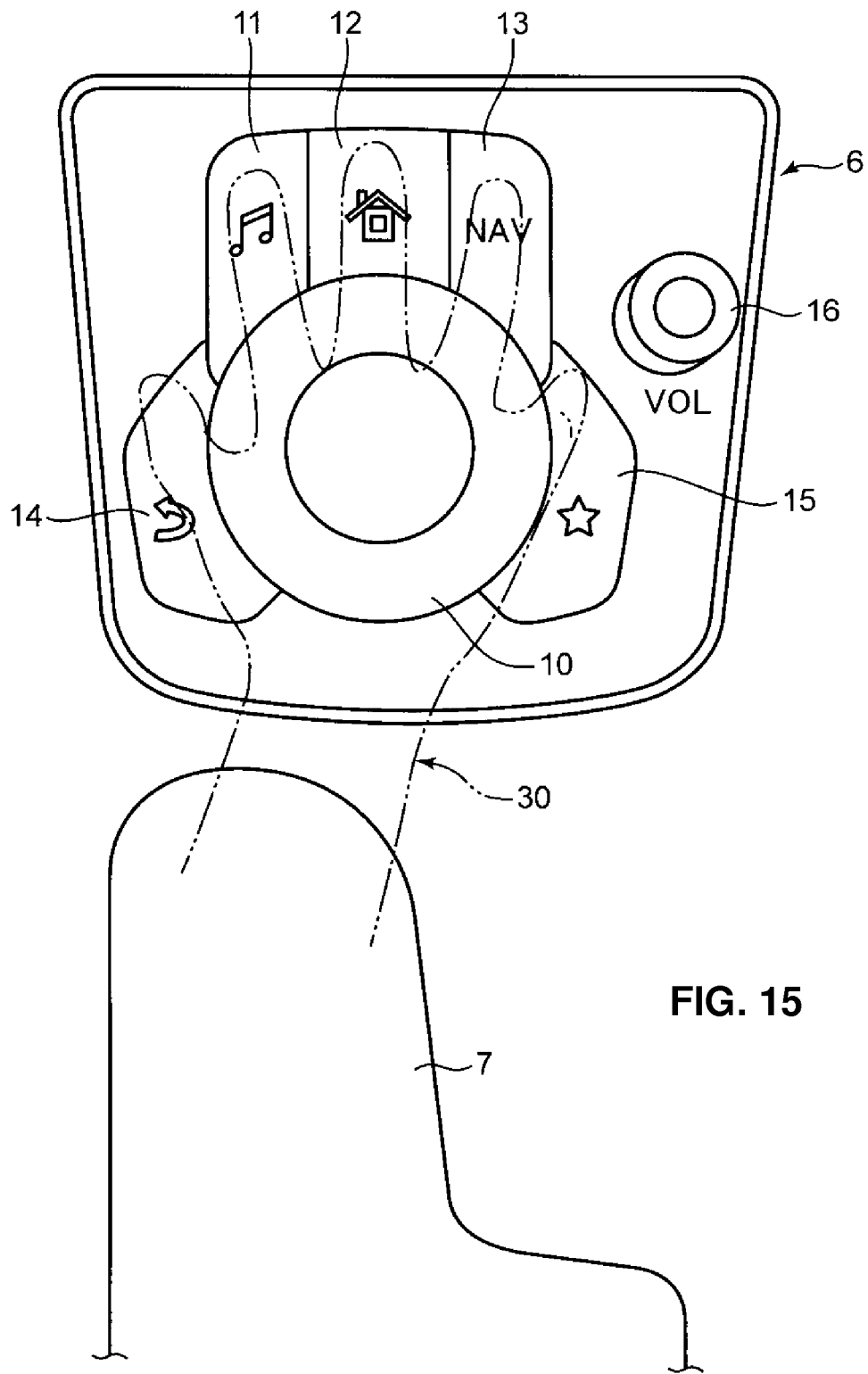
FIG. 15 is a plan view to explain a use manner of a hand when the operational portion is operated.

Further, according to the present embodiment, the three pushing switches (the left pushing switch 11, the central pushing switch 12, and the right pushing switch 13) are arranged in the arc shape around the dial switch 10 in the area positioned in front of the columnar-shaped dial switch 10. Thereby, as shown in FIG. 15, for example, the three pushing switches 11, 12, 13 can be pushed down operationally by the forefinger, the middle finger and the third finger of the driver's hand, respectively, in a state in which the palm of the hand is placed on the upper face of the dial switch 10, so that the operability of the switches 11, 12, 13 can be more improved. Herein, according to the present embodiment, the driver can place an elbow of the arm on the armrest 7 provided in back of the operational portion 6 as shown in FIG. 5, the driver can operate the respective switches at the operational portion 6 more comfortably.

It seems that even if the above-described pushing switches 11, 12, 13 exist, beginners who do not have enough experience of vehicle driving may execute the desired function only by using the dial switch 10, looking at the screen of the display portion 20. However, it is expected that drivers who get used to operating the respective switches may recognize the existence of the above-described pushing switches 11, 12, 13, so that desired operations may be conducted by using these switches properly. Thus, drivers may come to conduct various operations without looking at the screen of the display portion 20 (without stopping looking ahead carefully during a vehicle driving), so that the safety may be improved.

Further, according to the present embodiment, the above-described changing of the position of the selection indication (highlight indication) among the three icons (the left-central icon 42, the central icon 43, and the right-central icon 44) in accordance with the operation of rotation or tilt of the dial switch 10 is executed while the respective positions of these three icons displayed on the display portion 20 are kept fixed. Thereby, since positional relationships of the three icons 42, 43, 44 and the three pushing switches 11-13 provided in front of the dial switch 10 are fixed (constant), the driver can easily recognize which icon becomes operative (active) for the function execution by operating the left pushing switch 11 or the right pushing switch 13, especially.

For example, it may be considered as a different embodiment that the icons are moved to the left or the right as a whole on the display portion 20 in accordance with the operation of rotation or tilt of the dial switch 10 and the selected icon is always displayed at the center of the screen. According to this different embodiment, however, the positional relationships of the left-central and right-central icon 42, 44 and the let and right pushing switches 11, 13 of the dial switch 10 are not fixed, the driver may not intuitively operate the pushing switches, so that the operability may deteriorate. By contrast, in a case in which the position of the selection indication is changed without moving the display positions of the icons like the above-described present embodiment, the positional relationships do not change, so that the driver can intuitively operate the pushing switches, thereby improving the operability.

Particularly, according to the present embodiment, the three icons 42-44 are displayed in the other area than the both-end portions of the display portion 20, and the other icons (the left-end icon 41 and the right-end icon 45) are displayed at the both-end portions of the display portion 20. Thereby, since the three icons 42-44 corresponding to the functions regarding the three pushing switches 11-13 are always displayed at the central area of the display portion 20, the superior operability can be provided even if the number of icons increases. Herein, while the five icons 41-45, in total, are displayed on the display portion 20 according to the present embodiment, the number of icons is not limited to five, but seven or more icons can be provided. However, if there are so many icons, there may be a problem of correspondence to the number of fingers or the like. Accordingly, the five icons may be preferable in this sense.

Moreover, according to the present embodiment, the first rear pushing switch 14 for returning the display of the display portion 20 to the previous (last) screen and the second rear pushing switch 15 for displaying the screen corresponding to the other function which is registered in advance by the driver on the display portion 20 are provided in addition to the three pushing switches 11-13, and these two pushing switches 14, 15 are arranged at the rearward positions from the three pushing switches 11-13. Thereby, a large variety of operations can be executed by using the five pushing switches 11-15 in total. Further, since the two additional pushing 14, 15 switches are arranged at the rearward positions from the three pushing switches 11-13, it can be prevented that the switches are operated by mistake, so that the superior operability can be maintained.

The present invention should not be limited to the above-described embodiment, and any other modifications or improvements may be applied within the scope of the claimed invention. For example, while the columnar-shaped switch having three operations of rotation, tilt and pushing-down is used as the dial switch 10 in the above-described embodiment, any type of switch can be applied as this dial switch 10 as long as it has at least one of the rotational operation and the tilt operation in addition to the pushing-down operation, not limited to the columnar-shaped one.

Further, while the highlight indication to illuminate the selected icon with the light of specified color from its back side is used as the selection indication to show which icon is selected on the menu screen of the display portion 20 in the above-described embodiment, any type of selection indication can be applied as long as the driver can recognize which icon is selected. An arrow-shaped pointer may be used, for example.

Additionally, while the change of the display of the display portion 20 is always described in relation with the operational portion 6 (the dial switch 10 and the pushing switches 11-15) in the above-described embodiment, any other operational means than the operational portion 6 may be applied additionally. For example, a touch panel type of display which can select an icon through driver's touching of the screen can be used as the display portion 20. In this case, the display of the display portion is changed not only when the operational portion 6 is operated but also when the icon displayed on the display portion is touched by a driver's finger.

What is claimed is:

1. An information display device for a vehicle, comprising:
an operational portion provided on a center console in a vehicle compartment;
a display portion provided at a specified position in the vehicle compartment which is visible to a driver; and
a control portion to control display of the display portion in accordance with an operation of the operational portion,
wherein said operational portion comprises a dial switch and at least three pushing switches provided around the dial switch, the dial switch being operative to be rotated or tilted and to be pushed down, the three pushing switches being configured to be pushed down respectively, the three pushing switches being comprised of a central pushing switch and left and right pushing switches which are provided on left and right sides of the central pushing switch, respectively,
said display portion is configured to display at least three different icons which are positioned side by side substantially laterally, together with a selection indication to show which icon is selected, as a menu screen for selecting functions of various onboard apparatuses corresponding to said three icons, the display portion being configured to display a default-state menu screen in which a centrally-positioned icon of said three icons is indicated as a selected icon when said dial switch is in a non-operational state of rotation or tilt,
said control portion is configured to control the display of the display portion such that a position of said selection indication showing the selected icon is changed among said three icons in accordance with an operation of rotation or tilt of the dial switch when the menu screen is displayed on the display portion, and also such that information regarding the function of the onboard apparatus corresponding to the selected icon with the selection indication is displayed in accordance with an operation of down-pushing of the dial switch,
said central pushing switch is configured to function as a home key such that said default-state menu screen is displayed on the display portion whenever the central pushing switch is pushed down, and said left and right pushing switches are configured to function as a shortcut key, respectively, such that information regarding the function of the onboard apparatus corresponding to a left-positioned icon of said three icons is displayed on the display portion whenever the left pushing switch is pushed down, and information regarding the function of the onboard apparatus corresponding to a right-positioned icon of said three icons is displayed on the display portion whenever the right pushing switch is pushed down.

2. The information display device for a vehicle of claim 1, wherein said dial switch is a columnar-shaped switch having a central axis extending vertically, and said three pushing switches are arranged in an arc shape around the dial switch in an area positioned in front of the dial switch.

3. The information display device for a vehicle of claim 2, wherein said changing of the position of the selection indication among the three icons in accordance with the operation of rotation or tilt of the dial switch is executed while respective positions of said three icons displayed on the display portion are kept fixed.

4. The information display device for a vehicle of claim 3, wherein said three icons are displayed in another area than both-end portions of the display portion, and other icons than the three icons are displayed at the both-end portions of the display portion.

5. The information display device for a vehicle of claim 4, wherein a single icon is displayed at each of said both-end portions of the display portion, so that five icons, in total, are displayed on the display portion.

6. The information display device for a vehicle of claim 2, wherein said operational portion further comprises, in addition to said three pushing switches, a pushing switch for returning the display of said display portion to a previous screen and a pushing switch for displaying a screen corresponding to another function which is registered in advance by a driver on the display portion, and said two additional pushing switches are arranged at rearward positions from the three pushing switches.

7. The information display device for a vehicle of claim 3, wherein said operational portion further comprises, in addition to said three pushing switches, a pushing switch for returning the display of said display portion to a previous screen and a pushing switch for displaying a screen corresponding to another function which is registered in advance by a driver on the display portion, and said two additional pushing switches are arranged at rearward positions from the three pushing switches.

8. The information display device for a vehicle of claim 4, wherein said operational portion further comprises, in addition to said three pushing switches, a pushing switch for returning the display of said display portion to a previous screen and a pushing switch for displaying a screen corresponding to another function which is registered in advance by a driver on the display portion, and said two additional pushing switches are arranged at rearward positions from the three pushing switches.

9. The information display device for a vehicle of claim 5, wherein said operational portion further comprises, in addition to said three pushing switches, a pushing switch for returning the display of said display portion to a previous screen and a pushing switch for displaying a screen corresponding to another function which is registered in advance by a driver on the display portion, and said two additional pushing switches are arranged at rearward positions from the three pushing switches.

* * * * *